United States Patent [19]

Beurrier

[11] 3,863,168

[45] Jan. 28, 1975

[54] AMPLIFIERS WITH PARALLEL-CONNECTED AMPLIFYING STAGES

[75] Inventor: Henry Richard Beurrier, Chester Township, Morris County, N.J.

[73] Assignee: Bell Telephone Laboratories, Incorporated, Murray Hill, N.J.

[22] Filed: Feb. 12, 1973

[21] Appl. No.: 331,535

[52] U.S. Cl. .................... 330/18, 330/19, 330/20, 330/30

[51] Int. Cl. .................... H03f 3/42

[58] Field of Search .......... 330/18, 20, 30 R, 14, 19

[56] References Cited

UNITED STATES PATENTS

| | | | |
|---|---|---|---|
| 3,360,739 | 12/1967 | Cooke-Yarborough | 330/20 X |
| 3,443,237 | 5/1969 | Prozeller | 330/18 X |
| 3,605,031 | 9/1971 | Tongue | 330/30 R |

*Primary Examiner*—Rudolph V. Rolinec
*Assistant Examiner*—Lawrence J. Dahl
*Attorney, Agent, or Firm*—S. Sherman

[57] ABSTRACT

This application discloses the manner in which a constant voltage source and a phase coherent constant current source can be connected to a common load, and how the power distribution between the two sources can be controlled by varying the ratio of the two output signals. The sources can be phase locked oscillators, or two amplifying stages coupling a common signal source to a common output load.

13 Claims, 11 Drawing Figures

AMPLIFIERS WITH PARALLEL-CONNECTED AMPLIFYING STAGES

This invention relates to amplifiers having parallel-connected amplifying stages.

BACKGROUND OF THE INVENTION

In United States Pat. Nos. 3,675,145 and 3,694,765, and copending applications Ser. No. 209,527, filed Dec. 20, 1971; Ser. No. 204,865, filed Dec. 6, 1971; and Ser. No. 113,200, filed Feb. 8, 1971, all assigned to applicant's assignee, there are described a class of amplifiers whose input and output impedances are matched, respectively, to the signal source impedance and to the output load impedance. Basically, such amplifiers comprises a pair of amplifying stages having mutually inverse terminal impedances, connected in parallel between the signal source and the output load. The desired impedance match is obtained, in each case, by the unique design of the input and output terminal networks.

A second amplifier characteristic of interest, referred to in the above-identified cases, was linearity. In this connection the amplifying stages disclosed comprised transistors connected in the highly degenerate common collector and common base configurations. However, the primary concern in each case was focused upon the terminal networks to achieve the desired terminal impedance match. By contrast, the broad object of the present invention is to improve the linearity of the class of amplifiers described hereinabove; to extend their dynamic range; and to increase their power handling capacity.

SUMMARY OF THE INVENTION

The present invention, in its broadest sense, relates to the manner in which a constant voltage source and a phase coherent constant current source can be connected to a common load, and how the power distribution between the two sources can be controlled by varying the ratio of the two output signals.

Of particular interest are those cases where the signal sources are amplifying stages, both of which derive their input signals from a common signal source. In a first embodiment of such an amplifier, the output load is connected in series with the output terminals of the constant current source and the constant voltage source to produce an amplifier having a high output impedance. In a second embodiment of the invention, the signal sources are connected in parallel with the output load to produce an amplifier having a very low output impedance.

In the simplest illustrative example of such amplifiers, one active stage comprises a transistor connected in the common collector configuration and the other a transistor connected in the common base configuration. To obtain a high output impedance amplifier, the output load is connected in series between the emitter of the former and the collector of the latter. To obtain a low output impedance amplifier, the emitter of the former and the collector of the latter are connected in parallel with the output load.

In one preferred mode of operation, the total output power is shared equally by the two transistors, thus doubling the power handling capacity of this type of amplifier. In a second preferred mode of operation, essentially all of the power is handled by one of the transistors while the other transistor serves to correct for deviations in linearity. In this latter case, the linear dynamic operating range of the loaded transistor can be extended.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
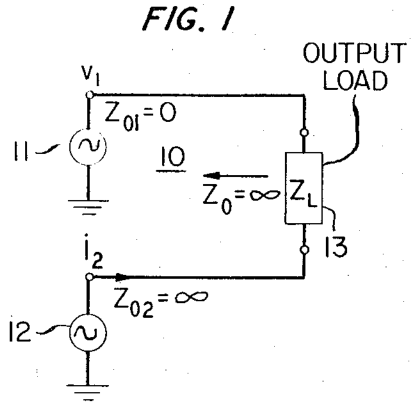
FIG. 1 shows a first embodiment of an output circuit in accordance with the invention.

Referring to the drawings, FIG. 1 shows a first embodiment of an output circuit 10, in accordance with the present invention, comprising two signal sources 11 and 12 whose output ends are connected in series with each other and with an output load 13, (i.e., all carry a common current). For the particular class of amplifiers of interest to the present invention, one of the sources 11 is characterized by an output impedance that is very much smaller, preferably an order of magnitude or more smaller than the load impedance $Z_L$. For purposes of discussion, the output impedance $Z_{01}$ of source 11 is indicated as being equal to zero and, hence, source 11 can be characterized as a constant voltage source.

Conversely, the output impedance $Z_{02}$ of the other source 12 is very much greater, preferably an order of magnitude or more greater than $Z_L$, and is shown as equal to infinity. As such, source 12 can be characterized as a constant current source. Connected in series with load 13, in the manner shown, the output impedance presented to the load by the two signal sources is equal to $Z_{01} + Z_{02}$ which, for the stated conditions, is essentially equal to $Z_{02}$ and, hence, is very high.

Figure 2:
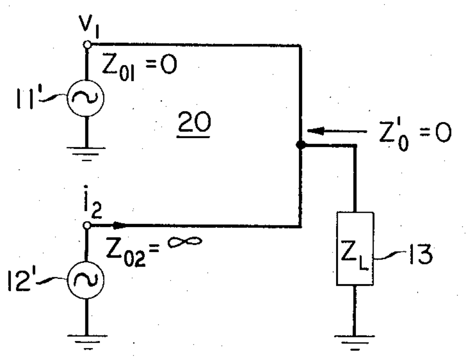
FIG. 2 shows a second embodiment of an output circuit in accordance with the invention.

FIG. 2 shows a second output circuit 20, in accordance with the invention, comprising two signal sources 11' and 12' having essentially the same relative output impedances as sources 11 and 12 of FIG. 1. In this configuration output ends of sources 11' and 12' and the output load 13 are connected in parallel, (i.e., all share a common voltage). Hence, the output impedance $Z'_0$ presented to the load by the two signal sources is equal to the parallel combination of $Z_{01}$ and $Z_{02}$, or essentially zero.

As indicated hereinabove, the present invention relates specifically to the output circuit of signal sources of the type illustrated in FIGS. 1 and 2. In particular, it relates to the manner in which the output voltage of the constant voltage source and the output current from the constant current source can be controlled so as to vary the power distribution between the two sources. While the sources can include such devices as phase locked oscillators, of particular interest to the present invention are the cases where the signal sources are two amplifying stages coupling between a common signal source and a common output load. While various specific amplifier circuits will be disclosed herein below, it will be recognized that they are merely intended as illustrations for purposes of explanation.

Figure 3:
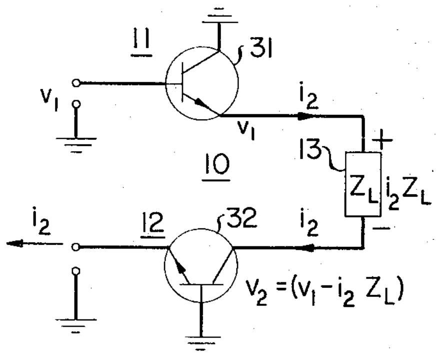
FIGS. 3 and 4 show specific embodiments of the output circuits of FIGS. 1 and 2 using transistors.
Figure 4:
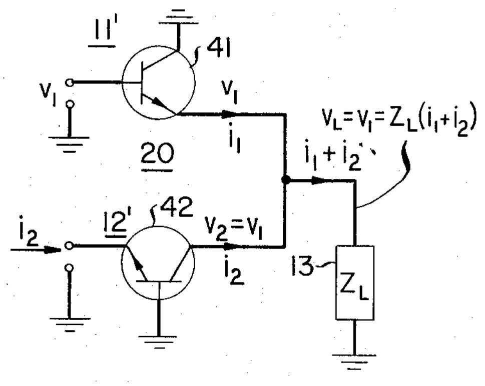

FIGS. 3 and 4, now to be considered, illustrate the use of transistors for obtaining the output impedance conditions specified above. Specifically, a low output impedance is obtained by means of a transistor connected in the common collector configuration, and a high output impedance is obtained by means of a transistor connected in the common base configuration. For example, in FIG. 3, one transistor 31 is connected in the common collector configuration and another transistor 32 is connected in the common base configuration. To form the output circuit shown in FIG. 1, the emitter of transistor 31 is connected to the collector of transistor 32 through the output load 13. In FIG. 4, the emitter of transistor 41, which is connected in the common collector configuration, is connected in parallel with both the collector of transistor 42, which is connected in the common base configuration, and the output load 13 to form the output circuit shown in FIG. 2.

In both of the above illustrative circuits, each of the transistors shown can either constitute the entire amplifying stage, or only the output portion of such stage. In either case, an input voltage applied to the base of the common collector transistor produces a voltage $V_1$ at the transistor emitter, and an input current drawn from or injected into the emitter of the common base transistor produces a current $i_2$ in the transistor collector. As will now be shown, the distribution of power between the two stages is determined by the ratio of $v_1$ to $i_2$, and the magnitude of the output load $Z_L$. For example, in FIG. 3, the emitter of transistor 31 and load 13 are in series with the collector of transistor 32. Hence, the load current and the emitter current of transistor 31 are also equal to $i_2$. The resulting voltage drop through the load is $i_2Z_L$ and the net voltage $v_2$ at the collector of transistor 32 is $v_2 = (v_1 - i_2Z_L)$. Thus, the currents and voltages are fully defined in terms of collector current $i_2$, the emitter voltage $v_1$, and the load impedance $Z_L$.

The output power $P_1$ delivered to the load by transistor 31 is equal to the emitter voltage $v_1$ times the current $i_2$ or $$P_1 = v_1 i_2. \quad (1)$$

Similarly, the output power $P_2$ delivered to the load by transistor 32 is equal to the collector voltage $v_2$ times the collector current $i_2$. However, noting that the output currents from the two transistors are 180° out of phase, we obtain $$P_2 = -i_2(v_1 - i_2Z_L). \quad (2)$$

The ratio $P$ of $P_2$ to $P_1$ is, therefore, given by $$P = P_2/P_1 = (-i_2(v_1 - i_2Z_L)/i_2v_1), \quad (3)$$

or $$v_1/i_2 = Z_L/(1 + P). \quad (4)$$

Equation (4) relates the output signals $v_1$ and $i_2$ to the output load for any given power distribution $P$. To illustrate, for a given output load impedance $Z_L$, equal power distribution, i.e., $P = 1$, is obtained when the ratio of $v_1$ to $i_2$ is equal to $Z_L/2$. If the output voltage $v_1$ is doubled, or $i_2$ is halved such that the ratio of output voltage $v_1$ to output current $i_2$ is equal to $Z_L$, we find that $P = 0$, or that all of the output power is supplied by transistor 31. Thus, by changing the relative values of $v_1$ and $i_2$, for a given output load, the power distribution between the two amplifying stages can be varied. Alternatively, for a given ratio of output signals, the power distribution can be varied by changing the magnitude of the output load. Which of these two techniques is used in any specific case will, of course, depend upon the particular application at hand.

A similar analysis can be made of the embodiment of FIG. 4. In this configuration, input voltage $v_1$, applied to the base of transistor 41 produces an output voltage $v_1$ at the emitter which is impressed across both output load 13 and the collector of transistor 42. Input current $i_2$ injected into the emitter of transistor 42 causes an equal output current $i_2$ in the collector of transistor 42. Current $i_2$ and a current $i_1$ from transistor 41 flow into load 13 to produce a voltage drop $Z_L(i_1 + i_2)$ across the load which is equal to $v_1$. The power distribution $P$ between transistors 41 and 42 is given by $$P = P_1/P_2 = (v_1i_1/v_2i_2). \quad (5)$$

Expressing $i_1$ in terms of $Z_L$, $i_2$ and $v_1$, and noting that $v_1 = v_2$, we obtain an expression for the ratio of the output signals in terms of $Z_L$ and $P$ given by $$v_1/i_2 = Z_L(1 + P). \quad (6)$$

For equal power division, i.e., $P = 1$, $$v_1/i_2 = 2Z_L. \quad (7)$$

For $P = 0$, in which case all of the output power is delivered by transistor 42, we obtain $$v_1/i_2 = Z_L. \quad (8)$$

As above, the power distribution can be changed either by changing the ratio of $v_1$ to $i_2$, or by changing the magnitude of the output load impedance $Z_L$.

As indicated hereinabove, the particular ratio of two output signals used is determined by the circumstances of the particular case. In those cases where the total power required to be delivered to the load exceeds the power capability of a single stage, the output power is shared by the two stages in the most favorable proportion. the maximum output power is, of course, equal to the sum of the maximum powers of the two stages. Alternatively, all of the power can be provided by one of the stages while the other stage is in a standby state and serves only to compensate for any nonlinearity in the input-output characteristic of the loaded stage. For example, in the embodiment of FIG. 3 all of output power is provided by transistor 31 when the ratio of the output signals $v_1$ and $i_2$ is equal to $Z_L$. If for any reason the emitter output voltage of transistor 31 should drop below the value of the input voltage, there would be a corresponding rise in the collector voltage of transistor 32. As a result, the latter transistor would supply just enough additional output power to maintain the proper total output power in load 13. similarly, in the embodiment of FIG. 4, when the ratio of output signal voltage and current is equal to $Z_L$, all of the output power is delivered by transistor 42. If for any reason the output current $i_2$ from transistor 42 drops below the level of the input signal, transistor 41 makes up the difference and, thereby, maintains a more constant level of output power in load 13.

Each of the above-described amplifier output circuits can be used individually; in combination with other types of amplifying stages; or in combination with each other, as will now be described.

Figure 5:
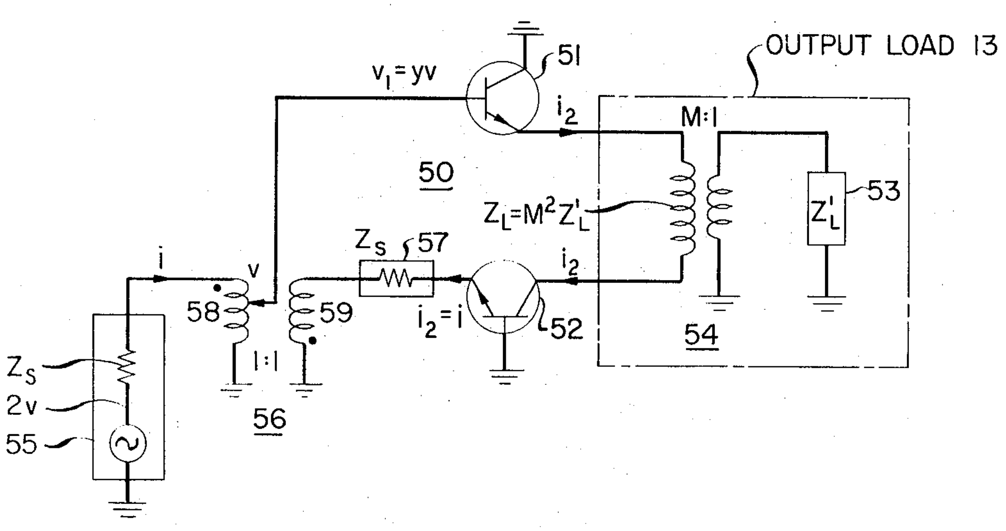
FIG. 5 shows an amplifier using the output circuit of FIG. 3.

FIG. 5, for example, shows an amplifier 50 employing the output circuit arrangement illustrated in FIG. 3 wherein the output end of a transistor 51, connected in the common collector configuration, and the output end of a transistor 52, connected in the common base configuration, are connected in series with output load 13. The latter includes a common load 53, of magnitude $Z_L'$, connected in series between the emitter of transistor 51 and the collector of transistor 52 by means of an M:1 turns ratio output transformer 54.

A common signal source 55, having an output impedance $Z_S$ and an open-circuit terminal voltage $2v$, is connected to the base and emitter electrodes of said transistors by means of a 1:1 turns ratio transformer 56 and a matching impedance 57 of magnitude $Z_S$. Specifically, signal source 55 is connected across one of the transformer windings 58; the base of transistor 51 is connected to a tap along winding 58; and the emitter of transistor 52 is connected in series with impedance 57 and the other transformer winding 59.

In operation, transformer 56 reflects an impedance $Z_S$ in series with source 55. The resulting source current is then given by $$i = 2v/2Z_S = v/Z_S \qquad (9)$$

and a voltage $v$, equal to half the open-circuit source voltage, appears across winding 58. A fraction of that voltage, $yv$, is applied to the base of transistor 51.

Since transformer 56 is a 1:1 turns ratio transformer, an equal current $i$ is induced in winding 59. However, the windings are oppositely poled such that the current into transistor 52 is 180° out of phase with the voltage $v$.

Thus, in this embodiment the input signal $v_1$ applied to the base of transistor 51 is equal to $yv$, and the input current $i_2$ drawn from the emitter of transistor 52 is equal to $i$. The ratio of $v_1/i_2$ is, therefore, equal to $yv/i = yZ_S$.

At the output end of the amplifier, the effective output load $Z_L$ in series with the two transistors is equal to $M^2Z_L'$. Knowing $Z_S$ and $Z_L'$, the tap location $y$ and the transformer turns ratio M can then be selected to provide any desired power distribution between the two transistors.

Figure 6:
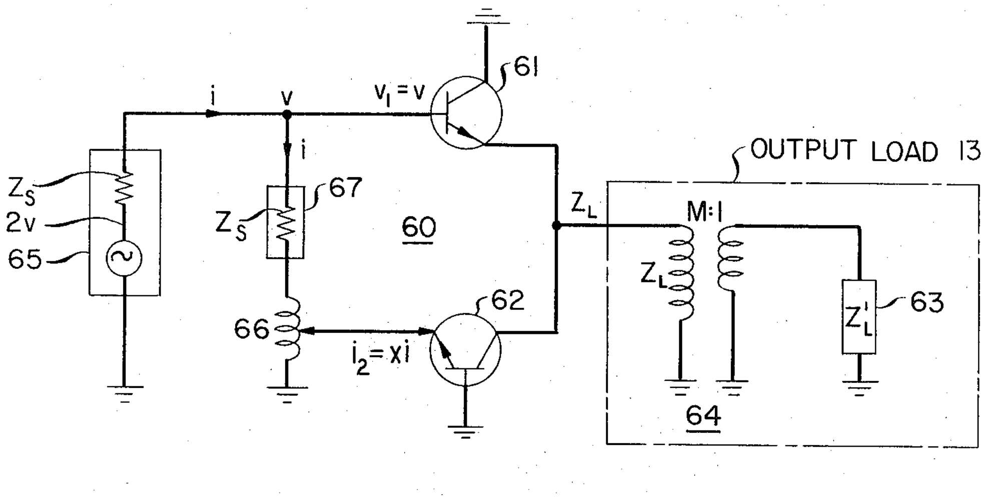
FIG. 6 shows an amplifier using the output circuit illustrated in FIG. 4.

FIG. 6, now to be considered, shows an amplifier 60, using the output circuit arrangement illustrated in FIG. 4, wherein the output end of a transistor 61, connected in the common collector configuration, and the output end of a transistor 62, connected in the common base configuration, are connected in parallel with output load 13. Specifically, the emitter of transistor 61 is connected in parallel with the collector of transistor 62, and both are effectively connected in parallel with a common load 63, of magnitude $Z_L'$, by means of an M:1 turns ratio transformer 64.

A common signal source 65 is connected to the base of transistor 61, and is coupled to the emitter of transistor 62 through a series-connected circuit which includes a matching impedance 67 and an autotransformer 66.

In operation, source 65 produces a voltage $v_1 = v$ at the base of transistor 61. Simultaneously, a fraction of the source current $i$ is coupled to the emitter of transistor 62, such that $i_2 = xi$. The ratio $v_1/i_2$ equal to $Z_S/x$ is, thus, a function of the source impedance and the tap location along transformer 66.

At the output end of the amplifier, the effective load $Z_L$ connected to the two stages is equal to $M^2Z_L'$. Thus, the relative power distribution between the stages is fully defined in terms of the tap location along input autotransformer 66 and the turns ratio M of the output transformer 64.

The use of the amplifier illustrated in FIG. 5 in cooperation with a conventional amplifier to form an impedance-matched amplifier is described in connection with FIGS. 7 and 8. The former shows, in block diagram, an impedance-matched amplifier 70 of the type disclosed in my copending application Ser. No. 113,200, filed Feb. 8, 1971, comprising a pair of two amplifying stages 71 and 72. The first amplifying stage 71 is characterized by an input impedance $Z_1$ that is very much greater than the output impedance $Z_S$ of signal source 73, and by an output impedance $Z_3$ that is very much less than the impedance $Z_L$ of output load 74. For all practical purposes one may consider that $Z_1 = \infty$ and $Z_3 = 0$. Conversely, stage 72 is characterized by an input impedance $Z_2$ that is very much smaller than the source impedance, and an output impedance $Z_4$ that is very much greater than the output load impedance. Again, for all practical purposes, $Z_3 = 0$ and $Z_4 = \infty$.

Signal source 73 is connected directly to stage 71, and through a series matching impedance 75 to stage 72. At the output end, stage 72 is connected directly to output load 74, while stage 71 is coupled to the load through a series matching impedance 76.

As explained in my copending application, an amplifier of this type has certain noise and distortion reducing advantages and, in addition, is matched at both its input and output ends. As was also explained, all of the useful output power is supplied by only one stage 72. Accordingly, the present invention can be advantageously used as a means of increasing the power capability of such an amplifier by using an amplifier of the type illustrated in FIG. 5 for stage 72, where such stage is excited so as to have both transistors deliver equal power to the load. Such an arrangement is illustrated in FIG. 8. Using the same identification numerals as in FIG. 7 to identify corresponding circuit elements, the amplifier shown in FIG. 8 comprises a first amplifying stage 71 which, for purposes of illustration, is a single transistor connected in the common collector configuration, and a second stage 72 comprising transistors 80 and 81 connected essentially as illustrated in FIG. 5.

Figure 7:
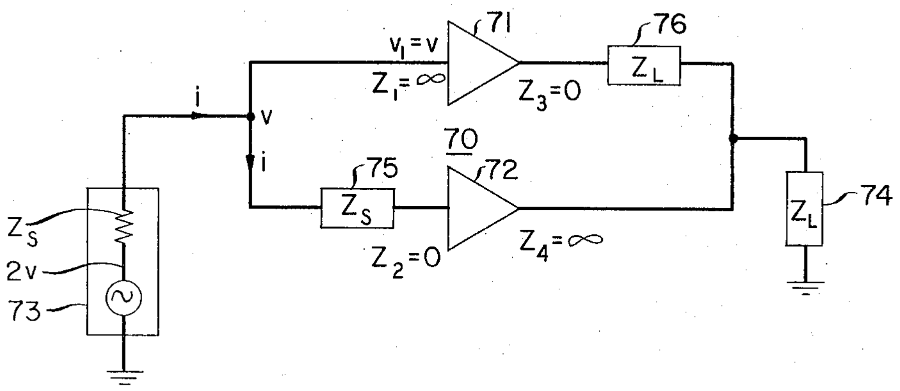
FIG. 7 (PRIOR ART)
FIG. 7 shows a prior art amplifier comprising two parallel connected amplifying stages.

Common signal source 73 is connected to stage 71 as in FIG. 7, and to stage 72 as in FIG. 5, producing a voltage $v$ at the base of transistor 85; a voltage $vy$ at the base of transistor 80; and causing an emitter current $i$ to flow in transistor 81.

At the output end of the amplifier, stage 71 is coupled to output load 74 through the series matching impedance 76. Load 74 is also connected in series with the emitter of transistor 80 and the collector of transistor 81 by means of a 1:1 turns ratio transformer 86.

Figure 8:
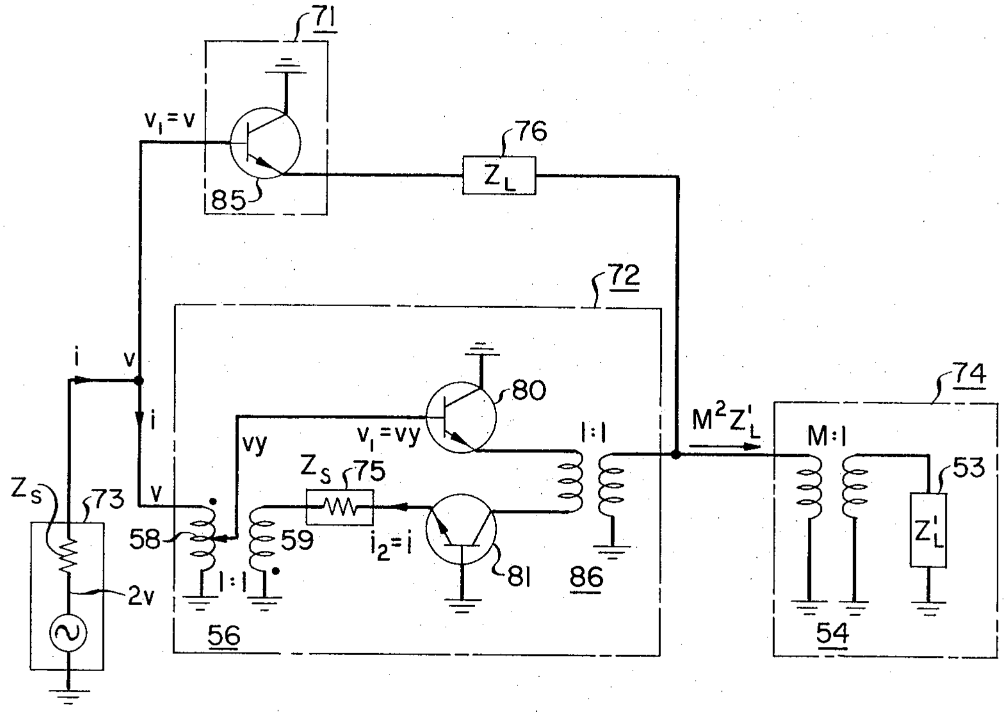
FIG. 8 shows the amplifier of FIG. 7 wherein the amplifier of FIG. 5 is used as one of the two stages.

As can be seen, the amplifier of FIG. 8 is essentially identical to that of FIG. 7 wherein stage 72 comprises the two transistors 80 and 81 connected as shown in FIG. 5. By proper selection of circuit parameters, as explained hereinabove, the total output power to the load, which is provided solely by stage 72, is divided equally between two transistors 80 and 81, thus doubling the power capabilities of the amplifier while preserving all of its other desirable features. Alternatively, all of the power can be supplied by transistor 80 of stage 72, in which case transistor 81 serves only to improve the linearity of transistor 80. In all other respects, the amplifier of FIG. 8 is the same as the prior art amplifier of FIG. 7.

Figure 9:
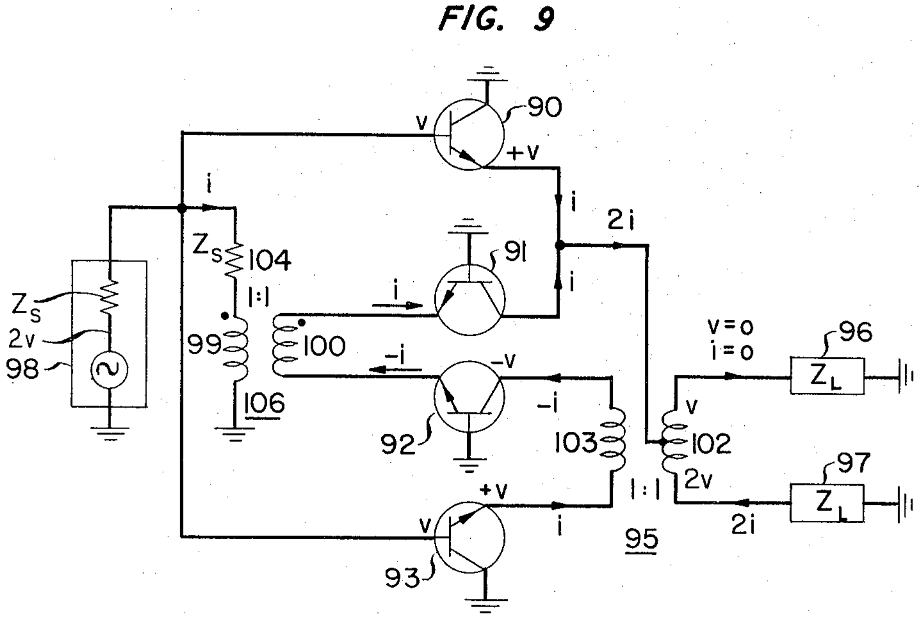
FIG. 9 shows an amplifier comprising two parallel connected stages wherein one stage employs the output circuit of FIG. 3 and the other stage employs the output circuit of FIG. 4.

FIG. 9, now to be considered, shows a specific embodiment of an amplifier utilizing one amplifier of the type shown in FIG. 3 as one stage, and one amplifier of the type shown in FIG. 4 as the other stage. The output ends of transistors 92 and 93, comprising one of the amplifying stages, are connected in series with the output load 97 and a matching impedance 96 by means of a 1:1 turns ratio transformer 95. The output ends of transistors 90 and 91, comprising the second amplifying stage, are connected in parallel with load 97 and impedance 96 by means of the center tapped winding 102 of transformer 95.

A common signal source 98, connected to a series matching impedance 104, and winding 99 of a 1:1 turns ratio transformer 106, causes a voltage $v$ to appear at the base of each of the transistors 90 and 93, and a current $i$ to be injected by means of transformer winding 100 into the emitter of transistor 91 and an equal current to be drawn from the emitter of transistor 92. The resulting output currents and voltages for each of the transistors and impedances are shown. In particular, for the case where the magnitude $Z_L$ of impedances 96 and 97 is equal to $Z_S$, all of the output power is delivered to output impedance 97, and is shared equally by the four transistors.

Figure 10:
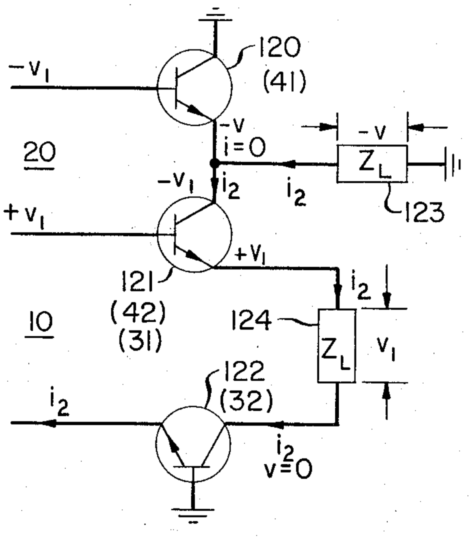
FIG. 10 shows a modification of the two output circuits of FIGS. 3 and 4 using only three transistors.

Referring again to FIGS. 3 and 4, it will be noted that transistor 42 of amplifier 20 is used to provide a collector current $i_2$. It will also be noted that the collector current of transistor 31 of amplifier 10 is also equal to $i_2$. When used separately, the collector of transistor 31 is normally grounded. However, when both amplifiers 10 and 20 are used together, as in FIG. 9, transistor 42 can be eliminated and the collector current of transistor 31 used in amplifier 20. Such an arrangement is illustrated in FIG. 10 which shows the equivalent of amplifiers 10 and 20 formed by means of only three transistors. The equivalent of amplifier 10 comprises transistor 121, corresponding to transistor 31, whose emitter is connected to the collector of transistor 122, corresponding to transistor 32 of FIG. 3, through a series load impedance 124. The equivalent of amplifier 20 comprises a transistor 120, corresponding to transistor 41 of FIG. 4, whose emitter is connected to the collector of transistor 121, which now serves as the equivalent of transistor 42. A load impedance 123 is connected in parallel with transistors 120 and 121.

Referring again to FIGS. 3 and 4, it will also be noted that with respect to the input current $i_2$, the input voltages applied to the common collector transistors are out of phase relative to each other. Thus, with respect to $i_2$, the phase of the voltage $v_1$ applied to the base of transistor 121 is as shown in FIG. 3 and, therefore, the voltage applied to the base of transistor 120 is 180° out of phase, or $-v_1$. The resulting output currents and voltages are also shown and, as can be seen, for the case where $v_1/i_2 = Z_L$, all of the power delivered to the two loads 123 and 124 is provided solely by transistor 121. Transistors 120 and 122 serve only to correct any nonlinearities that may occur in transistor 121. Specifically, if the voltage $v_1$ at the emitter of transistor 121 tends to drop below the input voltage $v_1$, a voltage will develop at the collector of transistor 122 to provide the additional power required to keep the power in load 124 constant. Similarly, if for any reason the collector current from transistor 121 tends to drop, or otherwise change from normal, transistor 120 will make up the deficiency so as to maintain the power delivered to load 123 more nearly constant. Indeed, if transistor 121 is completely removed from the circuit and the upper end of impedance 124 grounded, which would be the equivalent of having transistor 121 totally disabled, the remaining two transistors would take over. Specifically, transistor 120 would deliver full power to load 123, and transistor 122 would deliver full power to load 124.

Figure 11:
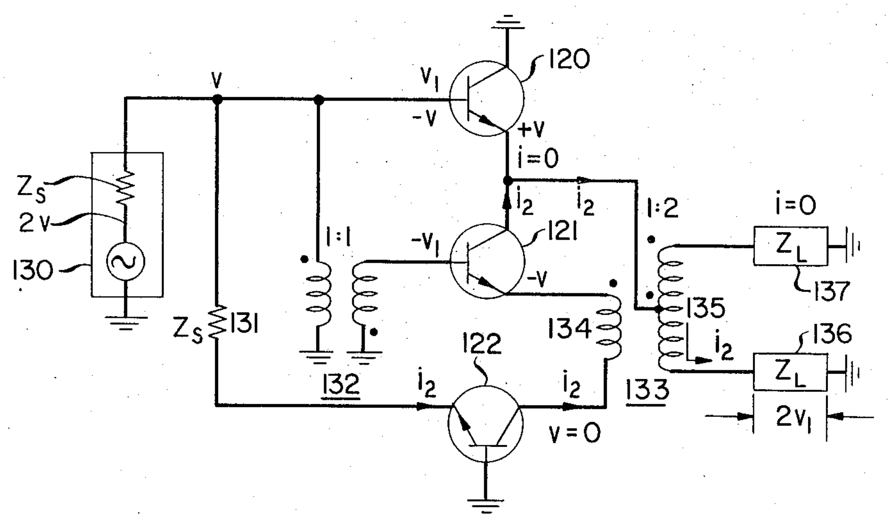
FIG. 11 shows the modification of FIG. 10 adapted to couple all of the output power to a common output load.

While the arrangement of FIG. 10 might be of some special interest, in a more practical arrangement the two loads 123 and 124 would be replaced by a common output load as illustrated in FIG. 11.

In the embodiment of FIG. 11, the input ends of the three transistors 120, 121 and 122 of FIG. 10 are coupled to a common signal source 130, and the outputs from said transistors are coupled to a common output load 136 by means of a 1:2 turns ratio transformer 133. A second, dummy load 137 serves to match the amplifier to the useful load 136. In normal operation, no output power is delivered to dummy load 137.

More specifically, signal source 130 is coupled to the emitter of transistor 122 through a series matching impedance 131 whose magnitude $Z_S$ is equal to the output impedance of the source. The resulting voltage $v$ at the terminal of source 130 is applied to the base of transistor 120 and to one winding of a 1:1 turns ratio transformer 132. The windings are so poled that a voltage $-v$ is produced by the transformer secondary winding, which voltage is then applied to the base of transistor 121.

At the output end of the amplifier, the collector of transistor 122 is connected to the emitter of transistor 121 through the primary winding 134 of output transformer 133. The collector of transistor 121 is connected to the emitter of transistor 120 and to a center tap along the secondary winding of transformer 133. The useful output load 136 is connected to one end of winding 135, and a matching load 137 to the other end of winding 135.

The indicated currents and voltages shown are for the case where the magnitude $Z_L$ of each of the impedances 136 and 137 is equal to $2Z_S$. If other load impedances are used, the input signals to the several transistors would have to be adjusted accordingly. For example, if $Z_L = Z_S$, the input current to the emitter of transistor 122 should be doubled. With these changes, the resulting power delivered to load 136 would also be doubled.

It will be recognized that the various circuits shown and described hereinabove are merely intended to be illustrative of the type of amplifying stages that can be employed to practice the present invention. More generally, the two stages can be totally dissimilar with respect to their overall gain and with respect to the number of active elements utilized. However, so long as their output impedances are as described hereinabove, and they provide two coherent signals, the two stages can be combined in the manner disclosed. Thus, in all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

I claim:

1. In combination;
a constant voltage signal source;
a constant current signal source;
and an output load;
characterized in that:
said sources are phase coherent;
and in that said sources and said load are connected in series.

2. In combination:
a constant voltage signal source;
a constant current signal source;
and an output load;
characterized in that:
said sources are phase coherent;
and in that said sources and said load are connected in parallel.

3. An amplifier for coupling a signal source to an output load comprising:
two amplifying stages;
one of said stages having an output impedance that is at least an order of magnitude smaller than the impedance of said output load;
the other of said stages having an output impedance that is at least an order of magnitude larger than the impedance of said output load;
means for coupling the output ends of said stages and said output load in series;
and means for coupling said signal source to the input end of each of said stages.

4. The amplifier in accordance with claim 3 wherein:
the output end of said one stage includes a first transistor connected in the common collector configuration;
the output end of said other stage includes a second transistor connected in the common base configuration;
and wherein the emitter of said first transistor, the collector of said second transistor, and said output load are connected in series.

5. The amplifier according to claim 3 wherein:
the output voltage from said one stage is $v_1$;
the output current from said other stage is $i_2$;
the magnitude of said load impedance is $Z_L$;
and wherein $$v_1/i_2 = Z_L/1+P$$

where $P$ is the ratio of the output power delivered to said load by said other stage to the output power delivered to said load by said one stage.

6. An amplifier for coupling a signal source to an output load comprising:
two amplifying stages;
one of said stages having an output impedance that is at least an order of magnitude smaller than the impedance of said output load;
the other of said stages having an output impedance that is at least an order of magnitude larger than the impedance of said output load;
means for coupling the output ends of said stages and said output load in parallel;
and means for coupling said signal source to the input end of each of said stages.

7. The amplifier in accordance with claim 6 wherein:
the output end of said one stage includes a first transistor connected in the common collector configuration;
the output end of said other stage includes a second transistor connected in the common base configuration;
and wherein the emitter of said first transistor, the collector of said second transistor, and said output load are connected in parallel.

8. The amplifier according to claim 6 wherein:
the output voltage from said one stage is $v_1$;
the output current from said other stage is $i_2$;
the magnitude of said load impedance is $Z_L$;
and wherein $$v_1/i_2 = Z_L\ (1+P)$$

where $P$ is the ratio of the output power delivered to said load by said one stage to the output power delivered to said load by said other stage.

9. An amplifier for coupling a signal source to a common output load of magnitude $Z_L$ comprising:
first, second and third transistors;
said first transistor being connected in the common collector configuration;
said third transistor being connected in the common base configuration;
output means for connecting the emitter of said first transistor and the collector of said second transistor in parallel with said output load, and for connecting the emitter of said second transistor and the collector of said third transistor in series with said output load;
and input means for coupling said signal source to the base of each of said first and second transistors, and to the emitter of said third transistor.

10. The amplifier according to claim 9 wherein said signal source and said input means induce:
a voltage $v_1$ at the base of said first transistor;
a voltage $-v_1$ at the base of said second transistor;
and a current $i_2$ at the emitter of said third transistor;
where $$v_1/i_2 = Z_L/2.$$

11. The amplifier according to claim 9 wherein said output means is a two winding transformer having a primary winding to secondary winding turns ratio of 1:2;
and wherein:

the emitter of said first transistor and the collector of said second transistor are connected to a center tap along said secondary winding;

the output load is connected to one end of said secondary winding;

a matching impedance is connected to the other end of said secondary winding;

and the emitter of said second transistor and the collector of said third transistor are connected in series with the primary winding of said transformer.

12. An amplifier for coupling a signal source to an output load of magnitude $Z_L$ comprising:

first, second and third transistors and a twowinding transformer;

said first and said second transistors being connected in the common collector configuration;

said third transistor being connected in the common base configuration;

one transformer winding being connected between the emitter of said second transistor and the collector of said third transistor;

the other transformer winding being connected across said output load;

the emitter of said first transistor being connected to one end of said output load through a series resistor having an impedance $Z_L$;

the other end of said output impedance being grounded;

and input means for coupling said signal source to the base of said first and second transistors and to the emitter of said third transistor.

13. The amplifier according to claim 12 where said input coupling means includes:

a two-winding transformer having one winding connected to said signal source and the other winding connected to the emitter of said third transistor through a series resistor;

means for connecting the base of said second transistor to a tap along the one transformer winding;

and means for connecting the base of said first transformer to said signal source.

* * * * *